H. S. GOUGHNOUR.
SWITCH STAND.
APPLICATION FILED DEC. 2, 1907.
901,804.
Patented Oct. 20, 1908.
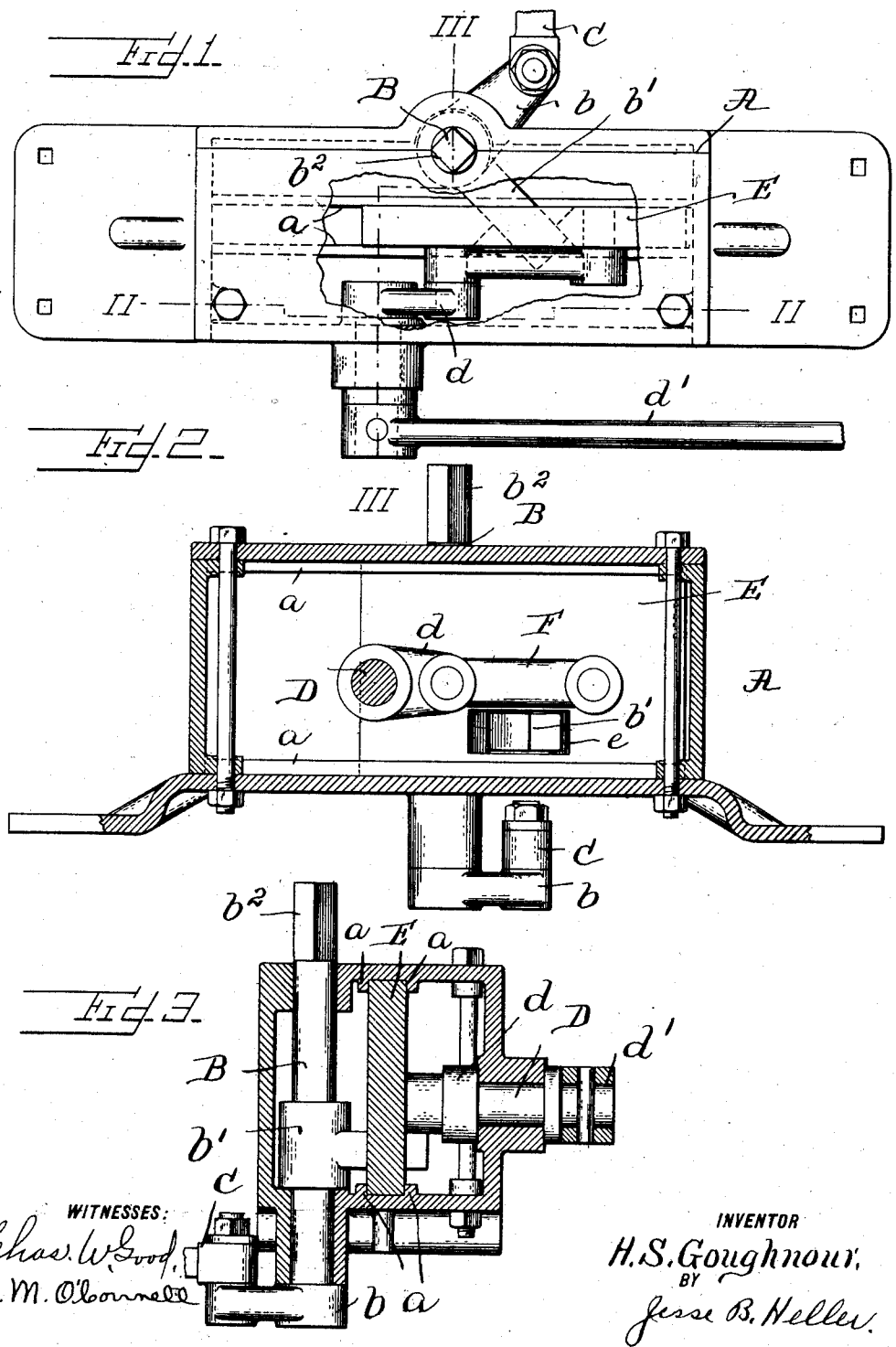
WITNESSES:
INVENTOR
H. S. Goughnour,
BY
Jesse B. Heller
ATTORNEY.

UNITED STATES PATENT OFFICE.

HEENAN SYLVESTER GOUGHNOUR, OF JOHNSTOWN, PENNSYLVANIA, ASSIGNOR TO THE LORAIN STEEL COMPANY, A CORPORATION OF PENNSYLVANIA.

SWITCH-STAND.

No. 901,804.    Specification of Letters Patent.    Patented Oct. 20, 1908.

Application filed December 2, 1907. Serial No. 404,870.

*To all whom it may concern:*

Be it known that I, HEENAN S. GOUGHNOUR, of Johnstown, in the county of Cambria and State of Pennsylvania, have invented a new and useful Improvement in Switch-Stands, of which the following is a full, clear, and exact description, reference being had to the accompanying drawings, which form a part of this specification.

My invention has relation to certain new and useful improvements in switch stands, and is designed to provide a structure of durable and effective character, whereby a switch can be thrown by the movement of a lever in a direction parallel to the track.

My invention also consists in the novel construction, arrangement, and combination of parts, as hereinafter described and pointed out in the appended claims, reference being had to the accompanying drawings, in which—

Figure 1, is a plan view of my improved switch stand; Figs. 2 and 3 are sectional views on the lines II—II and III—III respectively of Fig. 1.

A is the casing which can be of any suitable character. Journaled in this casing, is a vertical shaft B, which is provided at its lower end with the crank $b$, to which is pivoted the switch rod C, which is in turn secured to the switch rails in any well known manner. Formed integrally with this shaft B, or secured thereto, is the crank $b'$, and the upper end of this shaft B is provided with the square head $b^2$, to which is secured the usual target.

D, is a shaft which is also journaled in the casing A, but at right angles to the shaft B. Secured to the inner end of this shaft D, is the crank $d$, and secured to the outer end is the operating lever $d'$.

Mounted in the guides $a\ a$ in the casing A, is a sliding plate E, having an orifice $e$, through which the crank $b'$ on the shaft B projects.

Pivotally connected to the plate E, and the crank $d$, is the link F.

When the operator desires to throw the switch, he first raises and then depresses the lever $d'$, to the opposite side of the shaft D, giving it a movement of about 180°; this movement of the lever $d'$ will rotate the shaft D, and with it the crank $d$, and the moving of the crank $d$, through the medium of the link F will move the plate E along the guides $a\ a$, which will in turn rotate the shaft B about 90° by the engagement of the plate and the crank $b'$, and the rotation of the shaft B, by means of the crank $b$, will move the switch rod C, and the switch rails to which it is to be connected.

As will readily be understood from the foregoing description, and by reference to drawings, the shaft B will be rotated by the movement of the plate E, but the plate E and the shaft D cannot be moved by the rotation of the shaft B, as the link F and the crank $d$ are on a line with each other when the mechanism is thrown to either of its extreme positions. This alining of the crank $d$ and link F forms a perfect lock for the plate E and shaft B, which will avoid the accidental displacement of the switch rails.

It will be obvious that various changes may be made in the details of construction and arrangement of parts without departing from the spirit and scope of my invention, as defined in and by the appended claims.

Having thus described my invention, what I claim as new, and desire to secure by Letters Patent, is:

1. In a switch-stand, a vertical shaft having a crank to which the switch rod is connected, a horizontal shaft having an operating lever and a crank, and a sliding connection between the crank on the horizontal shaft and the vertical shaft to transmit motion from the horizontal to the vertical shaft.

2. In a switch-stand, a vertical shaft having a crank to which the switch rod is connected, a horizontal shaft having an operating lever and a crank connected thereto, and a sliding connection between the crank on the horizontal shaft and a second crank on the vertical shaft, to transmit motion from the horizontal shaft to the vertical shaft.

3. In a switch-stand, a vertical or target shaft having a crank to which the switch rod is connected, a second crank on said shaft in engagement with a sliding plate, a horizontal or operating shaft having a crank and an operating lever connected thereto, and connections between the crank on the operating shaft and the sliding plate.

4. In a switch-stand, a vertical or target shaft having a crank to which the switch rod is connected, a second crank on said shaft in engagement with a sliding plate, a horizontal or operating shaft having a crank and an operating lever connected thereto, and a link connecting the crank on the operating shaft and the sliding plate.

5. A switch stand having a switch actuating shaft, and an operating shaft, said shafts being at right angles to each other, connecting mechanism between said shafts including a rectilinear movable member arranged to move the switch actuating shaft, and lock the same in its turned position.

6. A switch stand having a switch actuating shaft, and an operating shaft, said shafts being at right angles to each other, connecting mechanisms between said shafts including a reciprocating member arranged to move and lock the switch actuating shaft.

7. A switch stand having a switch actuating shaft, and an operating shaft having an operating lever movable parallel with the track, said shafts being at right angles to each other, connecting mechanism between said shafts including a reciprocating member arranged to move and lock the switch actuating shaft.

8. In a switch stand, a shaft having a projecting arm, operative means including a reciprocating member connected to the arm to move and lock the shaft by a single movement.

9. In a switch stand, a shaft having a projecting arm, operative means including a reciprocating member connected to the arm to unlock and move the shaft by a single movement.

10. In a switch stand, a shaft having a projecting arm, operative means including a reciprocating member connected to the arm to move and lock or to unlock and move the shaft by a single movement.

In testimony whereof, I have affixed my signature in presence of two witnesses.

HEENAN SYLVESTER GOUGHNOUR.

Witnesses:
CHAS. W. GOOD,
H. W. SMITH.